US011966470B2

(12) United States Patent
Yuceer et al.

(10) Patent No.: US 11,966,470 B2
(45) Date of Patent: Apr. 23, 2024

(54) DETECTING AND PREVENTING DISTRIBUTED DATA EXFILTRATION ATTACKS

(71) Applicant: International Business Machines Corporation, Armonk, NY (US)

(72) Inventors: Ilgen Banu Yuceer, London (GB); Saritha Arunkumar, Basingstoke (GB); Juliet Grout, Evesham (GB); Seema Nagar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 318 days.

(21) Appl. No.: 17/455,021

(22) Filed: Nov. 16, 2021

(65) Prior Publication Data

US 2023/0153425 A1 May 18, 2023

(51) Int. Cl.
*G06F 21/55* (2013.01)
*H04L 9/40* (2022.01)

(52) U.S. Cl.
CPC ............ *G06F 21/554* (2013.01); *H04L 63/10* (2013.01); *G06F 2221/034* (2013.01)

(58) Field of Classification Search
CPC ............. G06F 21/554; G06F 2221/034; G06F 21/552; H04L 63/10; H04L 63/1416; H04L 63/1425; H04L 63/1433
See application file for complete search history.

(56) References Cited

U.S. PATENT DOCUMENTS

| | | | |
|---|---|---|---|
| 9,483,742 B1 | 11/2016 | Ahmed | |
| 10,091,222 B1 | 10/2018 | Langton | |
| 10,362,048 B2 | 7/2019 | Alexander | |
| 10,742,676 B2 | 8/2020 | Mahaffey | |
| 10,911,470 B2 * | 2/2021 | Muddu | ................. G06F 3/0482 |
| 2018/0004958 A1 | 1/2018 | Reinecke | |
| 2019/0332786 A1 | 10/2019 | Brandwine | |

(Continued)

FOREIGN PATENT DOCUMENTS

IN 201941006651 A 8/2020

OTHER PUBLICATIONS

Mell et al., "The NIST Definition of Cloud Computing, National Institute of Standards and Technology", Special Publication 800-145, Sep. 2011, 7 pages.

*Primary Examiner* — Aftab N. Khan
(74) *Attorney, Agent, or Firm* — Edward P. Li (57) ABSTRACT

A computer-implemented method and a computer system for detecting and preventing distributed data exfiltration attacks. The computer system calculates historical usage statistics for a service, instances of the service, and clients requesting the instances, generates a baseline of normal usage activities for the clients and the instances based on the historical usage statistics, monitors current activities of the clients to build signatures of queries by the clients and signatures of the instances, and correlates the signatures to determine whether a data exfiltration attack is in progress. In response to determining that the data exfiltration attack is in progress, the computer system increases one or more risk scores corresponding to the data exfiltration attack. In response to determining that the one or more risk scores and an overall risk score of the service exceed a predetermined threshold, the computer system generates an alert of the data exfiltration attack.

18 Claims, 5 Drawing Sheets

(56) References Cited

U.S. PATENT DOCUMENTS

| | | | |
|---|---|---|---|
| 2020/0021607 A1* | 1/2020 | Muddu | G06F 16/254 |
| 2021/0352136 A1* | 11/2021 | Dojka | H04L 67/34 |
| 2023/0048011 A1* | 2/2023 | Mody | G06Q 10/063 |
| 2023/0051921 A1* | 2/2023 | Madala | G06N 20/00 |

* cited by examiner

DETECTING AND PREVENTING DISTRIBUTED DATA EXFILTRATION ATTACKS

BACKGROUND

The present invention relates generally to security of cloud services, and more particularly to detecting and preventing distributed data exfiltration attacks.

Cloud services provide many instances of the same service for scaling, high availability, and geographic proximity to the clients, for both better response times and meeting privacy and legal requirements. While the multiple instances improve the quality of the service provided, the multiple instances also increase the attack surface available to adversaries and make it more difficult to detect certain attacks targeting the different instances. The attacker can distribute the portions of the attacks among different instances to disguise their attempts as valid client requests.

One example of adversarial techniques is data exfiltration by performing smaller allowed queries to each service instance and then merging them to steal data without being detected. Each service instance can enforce its own rate and data limits and has protections built in to prevent large amounts of data being requested. However, if the attacker is requesting allowed amounts of data from different instances of the service, the attack can go undetected, especially if different geographic locations are being targeted. In addition, the attacker can also change locations by originating the requests from multiple different IP addresses to make it harder to correlate all the different requests into a single coordinated data exfiltration attack. All of these factors make it very difficult for traditional security tools to detect these types of attacks.

Traditional rate limiting and anomaly detection controls, as well as Intrusion Prevention Systems (IPS) and Security Intelligence and Event Management (SIEM) systems, can be used to detect suspicious data transfers. These tools can detect large amounts of data downloaded from a server and can detect data transfers by unauthorized users. However, these tools fall short when the small authorized downloads are distributed among many service instances and are initiated from many different places by authorized users.

SUMMARY

In one aspect, a computer-implemented method for detecting and preventing distributed data exfiltration attacks is provided. The method includes calculating historical usage statistics for a service in an infrastructure, instances of the service, and clients requesting the instances. The method further includes generating a baseline of normal usage activities for respective ones of the clients and respective ones of the instances, based on the historical usage statistics. The method further includes monitoring current usage activities of the clients to build signatures of queries by the clients and signatures of the instances, over sliding windows of the queries. The method further includes correlating the signatures of the queries and the signatures of the instances to determine whether a data exfiltration attack is in progress. The method further includes, in response to determining that the data exfiltration attack is in progress, increasing one or more risk scores corresponding to the data exfiltration attack. The method further includes, in response to determining that the one or more risk scores and an overall risk score of the service exceed a predetermined threshold, generating an alert of the data exfiltration attack.

In another aspect, a computer system for detecting and preventing distributed data exfiltration attacks is provided. The computer system comprises one or more processors, one or more computer readable tangible storage devices, and program instructions stored on at least one of the one or more computer readable tangible storage devices for execution by at least one of the one or more processors. The program instructions are executable to: calculate historical usage statistics for a service in an infrastructure, instances of the service, and clients requesting the instances; generating a baseline of normal usage activities for respective ones of the clients and respective ones of the instances, based on the historical usage statistics; monitor current usage activities of the clients to build signatures of queries by the clients and signatures of the instances, over sliding windows of the queries; correlate the signatures of the queries and the signatures of the instances to determine whether a data exfiltration attack is in progress; in response to determining that the data exfiltration attack is in progress, increase one or more risk scores corresponding to the data exfiltration attack; and in response to determining that the one or more risk scores and an overall risk score of the service exceed a predetermined threshold, generate an alert of the data exfiltration attack.

DETAILED DESCRIPTION

In embodiments of the present invention, a system and a method are proposed for detecting and preventing distributed data exfiltration attacks. In a distributed data exfiltration attack, an attacker can compose multiple queries targeting at multiple instances of a data service to carry out the attack. In the distributed data exfiltration attack, each individual query does not defy any data security policies in place but the multiple queries combined together are capable of conducting the data exfiltration attack. For detecting and preventing the distributed data exfiltration attack, the proposed system creates unique signature for each query. The signature may include data segment which is accessed, the client, device ID, geographic location, and any other relevant parameters. The proposed system combines signatures in a sliding window to compute a risk score. The proposed system raises an alert and/or denies the client (who is identified as the attacker) further access.

In embodiments of the present invention, the proposed system allows for an advanced persistent attack to be detected, which may otherwise go undetected. If an attacker gains access to a service and requested data in segments which are within the use cases of a given environment security tool parameters, then the attack will go unnoticed. The present invention proposes a unique way of detecting data exfiltration using a data centric view, which tracks the data as requested.

The proposed system builds an inventory of the different instances of the monitored services. The proposed system analyzes and correlates their audit data together to gain insights that can be missed otherwise. The proposed system uses a risk scoring system that assigns a score to each of the service instances and calculates an overall risk score for the service based on the scores of the individual instances. An alert is raised when the overall risk score crosses a predetermined threshold. In addition, risk scores are calculated for the clients involved in the suspicious activity and the clients can be added to deny lists to prevent further access to the service.

The attacker can distribute the portions of the attack among different instances to disguise the attacker's attempts as valid client requests. Traditional security controls do not detect these types of data exfiltration attempts. The present invention detects data exfiltration even when the attack is distributed among many service instances to disguise the attack as a legitimate activity, by using a unique method to monitor and analyze many small transactions to build a complete view of activity.

Figure 1:
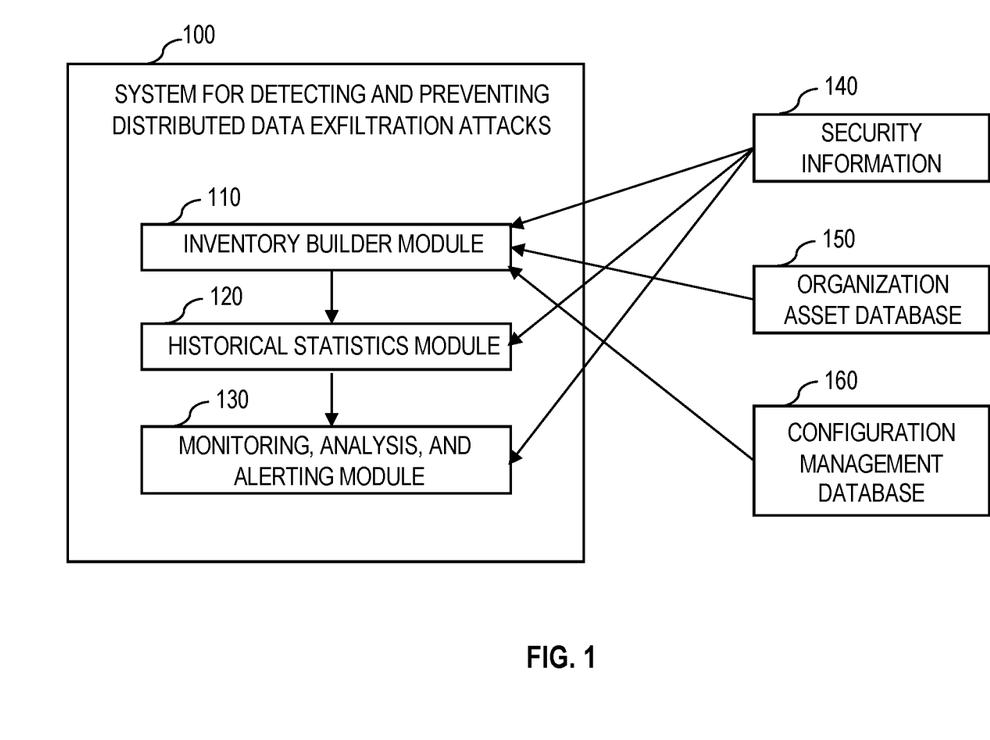
FIG. 1 is a systematic diagram illustrating a system for detecting and preventing distributed data exfiltration attacks, in accordance with one embodiment of the present invention.

FIG. 1 is a systematic diagram illustrating system 100 for detecting and preventing distributed data exfiltration attacks, in accordance with one embodiment of the present invention. System 100 for detecting and preventing distributed data exfiltration attacks is implemented on one or more computing devices or servers. A computing device or server is described in more detail in later paragraphs with reference to FIG. 3. System 100 may be implemented in a cloud computing environment. The cloud computing environment is described in more detail in later paragraphs with reference to FIG. 4 and FIG. 5.

System 100 for detecting and preventing distributed data exfiltration attacks includes three components, namely inventory builder module 110, historical statistics module 120, and monitoring, analysis, and alerting module 130. Inventory builder module 110 retrieves and analyzes security information 140 available from, for example, Security Information and Event Management (SIEM), IBM Cloud Pak for Security, or Extended Detection and Response (XDR). Security information 140 includes relevant security audit and event logs. With SIEM, software products and services combine security information management (SIM) and security event management (SEM) and provide real-time analysis of security alerts generated by applications and network hardware. IBM Cloud Pak for Security provides a platform to quickly integrate security tools and generate deeper insights into threats across hybrid, multi-cloud environments. XDR collects and correlates data across various network points such as servers, email, cloud workloads, and endpoints. Inventory builder module 110 also retrieves and analyzes data from organization asset database 150 and data from configuration management database (CMDB) 160. Inventory builder module 110 queries organization asset database 150 and CMDB 160 to identify different instances of a service. Inventory builder module 110 uses security information 140, organization asset database 150, and CMDB 160 to build an inventory of monitored services. Inventory builder module 110 identifies different servers, data centers, and geographic locations that host the service, type of the service (public, restricted access, production, or test instance, etc).

Inventory builder module 110 supports configuration to assign levels of sensitivity to different data types and/or application programming interfaces (APIs) used, and the configuration can be obtained from CMDB 160. Inventory builder module 110 calculates a risk threshold for each service based on the value of criticality of the service. In some cases, the data about the value of criticality of the service may not be explicitly available in organization asset database 150 or CMDB 160. Inventory builder module 110 analyzes the locations, uniform resource locators (URLs), asset types, and application types available in organization asset database 150 to generate an inventory of servers that host the service. Inventory builder module 110 also queries and analyzes the service event logs being collected by the SIEM or available via Cloud Pak to help with inventory building. In addition, inventory builder module 110 has its own user interface (UI) component. From a configuration UI, a system admin can view and adjust automatic detected services and instances, configure which services to monitor, adjust risk thresholds for each of the services that determine when an alert should be raised, and define the actions to be taken when an attack is detected.

Each monitored service instance is configured to send their audit logs to a central location for correlation, analysis, and storage; the central location may be, for example, SIEM, IBM Cloud Pak for Security, or XDR. Other network monitoring devices, such as fire walls, web proxies, or devices of intrusion detection system or intrusion protection system (IDS/IPS), may also collect the required information and send to SIEM, IBM Cloud Pak for Security, or XDR. The Cloud Pak for Security platform may be used to allow centralized access to data when multiple SIEMs and data sources are involved in monitoring.

Historical statistics module 120 in system 100 monitors services and clients requesting data from the services. Historical statistics module 120 calculates and stores historical usage statistics for each service, instances of each service, and clients, while monitoring the services and the clients.

Monitoring, analysis, and alerting module 130 in system 100 assigns a dynamic risk score to each client or IP address that requests data from the monitored services. The client's risk score also contributes to a risk score of a particular service instance that a client accesses; thus, monitoring, analysis, and alerting module 130 also assigns a dynamic risk score to each service instance.

Monitoring, analysis, and alerting module 130 monitors event log data from individual service instances to build signatures of queries and signatures of instances for a period of time. The signatures are built for sliding windows of the queries; for example, 1 to 5 minutes, then 2 to 6 minutes, and so on. The signatures of queries are the suspicious patterns detected for clients, and the signatures of instances are the suspicious patterns detected against service instances. The signatures are a set of patterns that are used to identify suspicious activities. For example, some signatures used in the present invention to identify data exfiltration include but not limited to sequential overlapping or non-overlapping chunks of data requests from multiple clients, requests from unusual geographic locations, requests from a single client to many different service instances, etc.

At the appropriate time as determined by the risk scores for a interval or a sliding window, the signatures that crossed a predetermined risk score threshold are correlated with each other to determine whether a distributed data exfiltration attack is in progress. If a distributed data exfiltration attack is in progress, monitoring, analysis, and alerting module 130 will increase one or more risk scores corresponding the distributed data exfiltration attack. If the one or more risk scores as well as an overall risk score of the service increase and then exceed a predetermined threshold, monitoring, analysis, and alerting module 130 generates an alert of the data exfiltration attack. If a risk score of any of the clients increases and then exceeds the predetermined threshold, monitoring, analysis, and alerting module 130 blocks further access of the client to the service.

Figure 2:
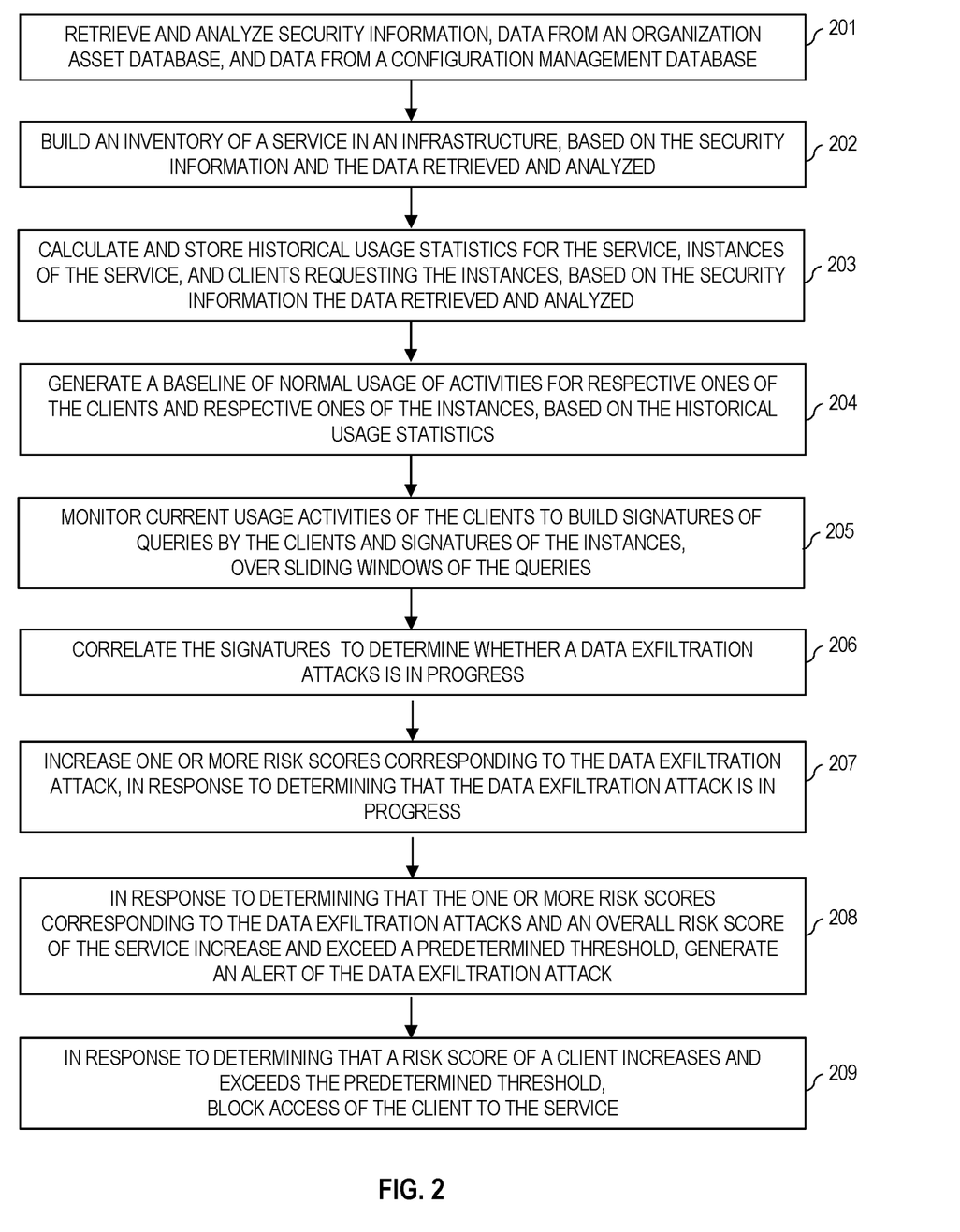
FIG. 2 is a flowchart showing operational steps of detecting and preventing distributed data exfiltration attacks, in accordance with one embodiment of the present invention.

FIG. 2 is a flowchart showing operational steps of detecting and preventing distributed data exfiltration attacks, in accordance with one embodiment of the present invention. The operation steps are implemented by a system for detecting and preventing distributed data exfiltration attacks (e.g., system 100 shown in FIG. 1). The system for detecting and preventing distributed data exfiltration attacks is hosted by one or more computing devices or servers (or by a computer system); therefore, the operation steps are performed by one or more computing devices or servers (or by a computer system).

At step 201, the computer system retrieves and analyzes security information, data from an organization asset database, and data from a configuration management database. In the embodiment shown in FIG. 1, inventory builder module 110 retrieves and analyzes security information 140, data from organization asset database 150, and data from a configuration management database (CMDB) 160. For example, security information 140 is available from Security Information and Event Management (SIEM), IBM Cloud Pak for Security, or extended detection and response (XDR).

At step 202, the computer system builds an inventory of a service in an infrastructure, based on the security information and the data retrieved and analyzed at step 201. The computer system builds an inventory of the different instances of the service. In the embodiment shown in FIG. 1, inventory builder module 110 builds the inventory of the service, based on security information 140, data from organization asset database 150, and data from a configuration management database (CMDB) 160.

At step 203, the computer system calculates and stores historical usage statistics for the service, instances of the service, and clients requesting the instances, based on the security information the data retrieved and analyzed. In the embodiment shown in FIG. 1, historical statistics module 120 calculates and stores historical usage statistics for the service, instances of the service, and clients requesting the instances, based on security information 140, data from organization asset database 150, and data from a configuration management database (CMDB) 160.

At step 204, the computer system generates a baseline of normal usage activities for respective ones of the clients and respective ones of the instances, based on the historical usage statistics obtained at step 203. In the embodiment shown in FIG. 1, monitoring, analysis, and alerting module 130 generates a baseline of normal usage activities for the respective ones of the clients and the respective ones of the instances.

At step 205, the computer system monitors current usage activities of the clients to build signatures of queries by the clients and signatures of the instances, over sliding windows of the queries. The signatures are built for sliding windows of the queries. The signatures of the queries are the suspicious patterns detected, and the signatures of the instances are the suspicious patterns detected. Anomalies in the current usage activities compared to the baseline of the normal usage activities are the signatures. For example, the signatures in the present invention include but not limited to sequential overlapping or non-overlapping chunks of data requests from multiple clients, requests from unusual geographic locations, and requests from a single client to many different service instances. In the embodiment shown in FIG. 1, monitoring, analysis, and alerting module 130 implements step 205.

At step 206, the computer system correlates the signatures to determine whether the data exfiltration attack is in progress. The signatures used to identify suspicious activities. The signatures that crossed a predetermined risk score threshold are correlated with each other to determine whether a distributed data exfiltration attack is in progress. In the embodiment shown in FIG. 1, monitoring, analysis, and alerting module 130 implements step 206.

In response to determining that the data exfiltration attack is in progress, at step 207, the computer system increases one or more risk scores corresponding to the data exfiltration attack. In the embodiment shown in FIG. 1, monitoring, analysis, and alerting module 130 implements step 207. In the following cases of the data exfiltration attacks, the computer system increases the one or more risk scores. In response to determining that a client requests data from multiple instances of a service, the computer system increases a risk score of the client and risk scores of the multiple instances, as a requested amount of the data increases. In response to determining that a client requests data from an instance that are not in a geographical location of the client, the computer system increases a risk score of the client and a risk score of the instance. In response to determining that a pattern of a client requesting data (e.g., requesting data from a different instance, a different location, or a different device) is different from a historical pattern, the computer system increases a risk score of the client and the risk scores of the different instances requested by the client. For example, a client has always requested access to a service from a geological location but one of the client's requests comes from an IP address in a different geological location; it is probably that someone in the different geological location impersonates the client or has stolen the client's credentials, so that the computer system increases the risk scores. In response to determining that a pattern is detected where data requested from the multiple instances within a give time frame can be ordered in a sequence, the computer system increases a risk score of the client and risk scores of the multiple instances. For example, a client requests 1-100 records from a first instance, 201-300 from a second instance, and 101-200 from a third instance; in this case, the computer system increases the risk score for the client and risk scores of the multiple instances, as the number of chunks requested increases. HTTP range headers on the client requests can be monitored for this purpose in addition to other audit events provided by the service. In response to determining that a pattern is detected where non-overlapping or mostly non-overlapping chunks from a data set are requested from multiple instances and/or by multiple clients in a given time frame, the computer system increases risk scores of the multiple clients and the risk scores of the multiple instances, as the number of chunks requested increases. In response to determining that the sum of data requested by a client from all instances of the service shows an anomaly against a historical pattern, the computer system increases risk scores of the client and the instances. Data available via the service is classified and labelled as to how sensitive it is. The computer system assigns levels of sensitivity to different data types and/or APIs as obtained from CMDB. The sensitivity level of the data downloaded is contributes to risk score calculation. As a requested amount of sensitive data increases, the computer system increases risk scores of the client and the instances.

At step 208, in response to determining that the one or more risk scores corresponding to the data exfiltration attack and an overall risk score of the service increase and exceed a predetermined threshold, the computer system generates an alert of the data exfiltration attack. The clients (including originating their devices and/or IP addresses) and the instances of the service are tagged with their own risk scores, and the risk scores contribute to the overall risk score of the service itself. In addition, all the other entities or clients related are also reported even though their risk scores have not yet exceeded the predetermined threshold. In the embodiment shown in FIG. 1, monitoring, analysis, and alerting module 130 implements step 208.

At step 209, in response to determining that a risk score of a client increases and then exceeds the predetermined threshold, the computer system blocks access of the client to the service. If any client is related to the data exfiltration attacks and the risk score of the client exceeds the predetermined threshold, the client and the IP address of the client are automatically added to a block list and prevented from further access to the service as well as other services.

Figure 3:
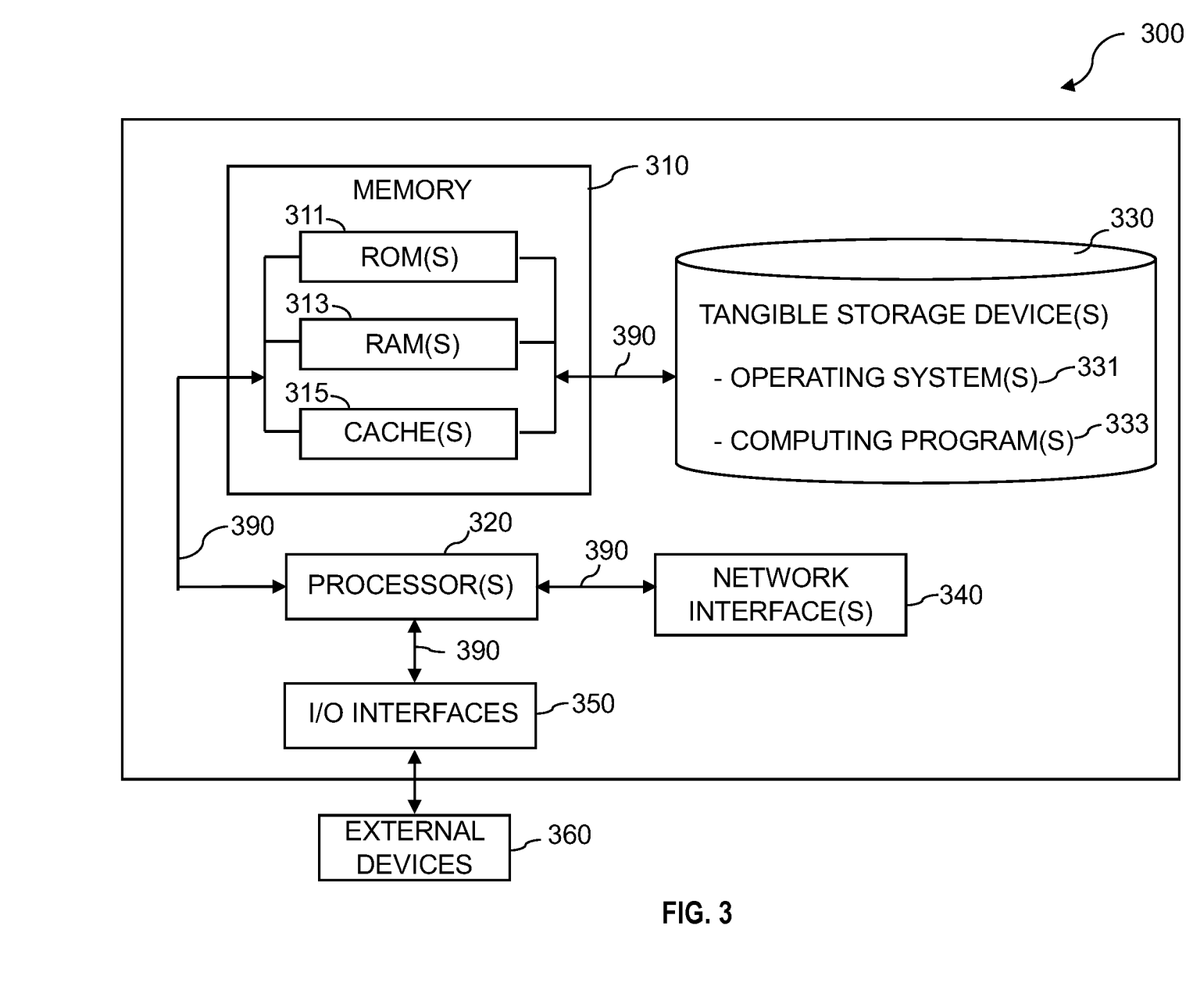
FIG. 3 is a diagram illustrating components of a computing device or server, in accordance with one embodiment of the present invention.

FIG. 3 is a diagram illustrating components of computing device or server 300, in accordance with one embodiment of the present invention. It should be appreciated that FIG. 3 provides only an illustration of one implementation and does not imply any limitations; different embodiments may be implemented.

Referring to FIG. 3, computing device or server 300 includes processor(s) 320, memory 310, and tangible storage device(s) 330. In FIG. 3, communications among the above-mentioned components of computing device or server 300 are denoted by numeral 390. Memory 310 includes ROM(s) (Read Only Memory) 311, RAM(s) (Random Access Memory) 313, and cache(s) 315. One or more operating systems 331 and one or more computer programs 333 reside on one or more computer readable tangible storage device(s) 330.

Computing device or server 300 further includes I/O interface(s) 350. I/O interface(s) 350 allows for input and output of data with external device(s) 360 that may be connected to computing device or server 300. Computing device or server 300 further includes network interface(s) 340 for communications between computing device or server 300 and a computer network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
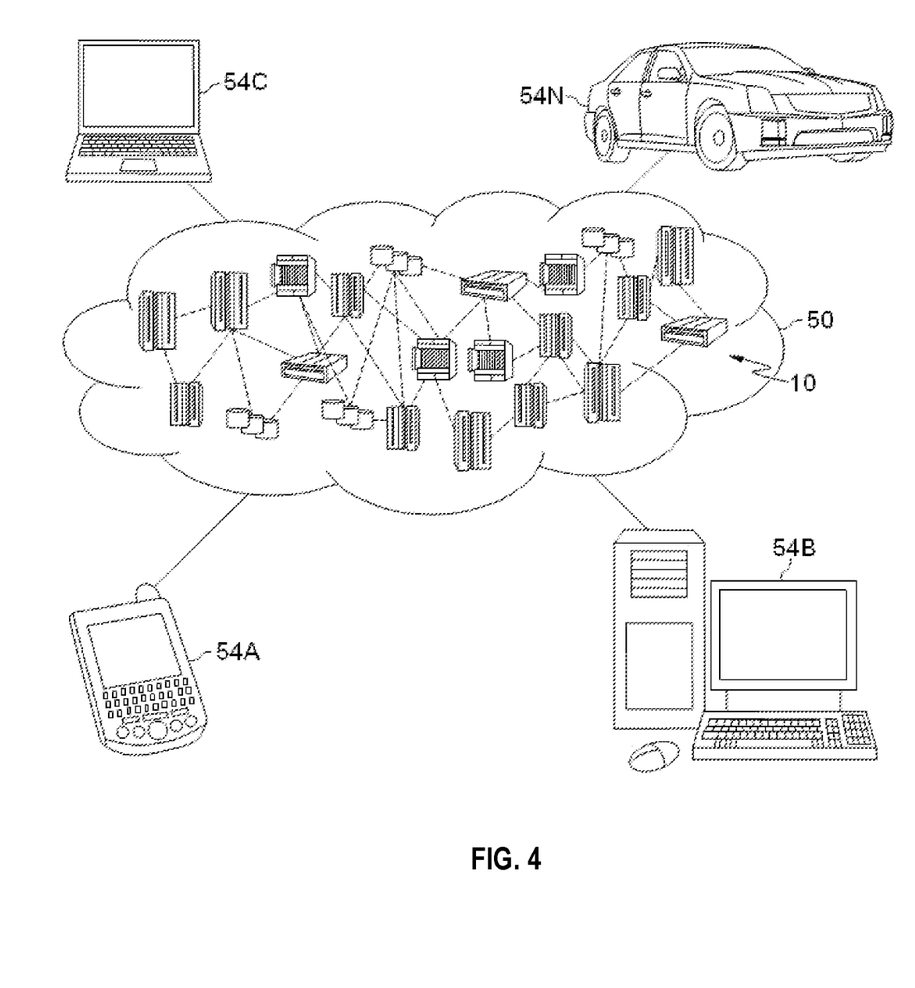
FIG. 4 depicts a cloud computing environment, in accordance with one embodiment of the present invention.

Referring now to FIG. 4, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 5:
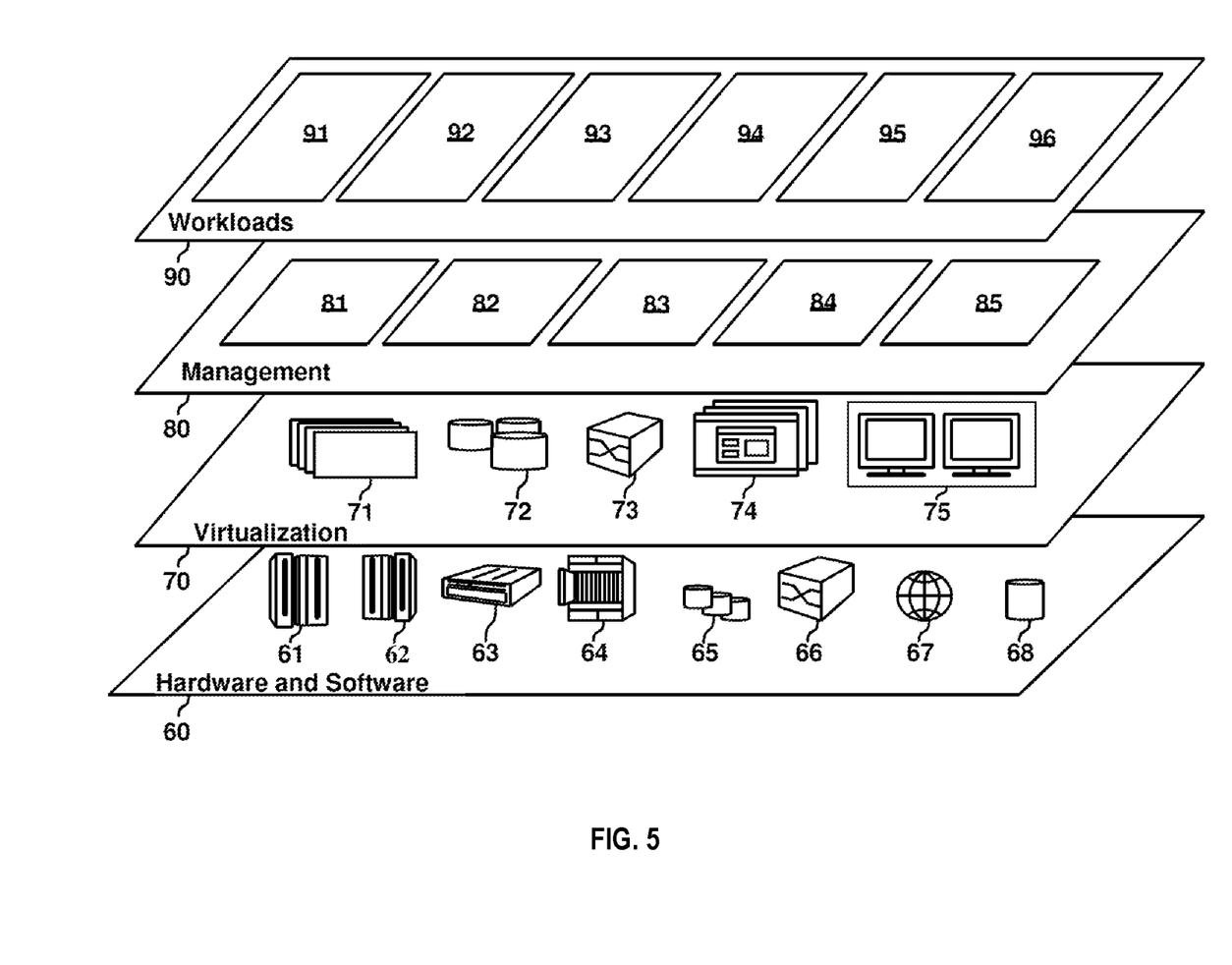
FIG. 5 depicts abstraction model layers in a cloud computing environment, in accordance with one embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and function 96. Function 96 in the present invention is the functionality of detecting and preventing distributed data exfiltration attacks.

What is claimed is:

1. A computer-implemented method for detecting and preventing distributed data exfiltration attacks, the method comprising:
   retrieving and analyzing security information, data from an organization asset database, and data from a configuration management database;
   building an inventory of the service, based on the security information and the data from the organization asset database, and the data from the configuration management database;
   calculating historical usage statistics for a service in an infrastructure, instances of the service, and clients requesting the instances, wherein calculating historical usage statistics is based on the security information, the data from the organization asset database, and the data from the configuration management database;
   generating a baseline of normal usage activities for respective ones of the instances, based on the historical usage statistics;
   monitoring current usage activities of the clients to build signatures of the instances, over sliding windows of the queries, wherein the signatures are anomalies in the current usage activities compared to the baseline of the normal usage activities;
   determining whether a data exfiltration attack to one of the instances is in progress, wherein the data exfiltration attack is distributed among the instances of the service instances to disguise the data exfiltration attack as a legitimate activity;
   in response to determining that the data exfiltration attack is in progress, increasing a risk score of the one of the instances;
   calculating an overall risk score of the service, based on risk scores of the instances of the service; and
   in response to determining that the overall risk score of the service exceed a predetermined threshold, generating an alert of the data exfiltration attack.

2. The computer-implemented method of claim 1, further comprising: calculating an risk score of a client;
   in response to determining that the risk score of the client exceeds the predetermined threshold, blocking access of the client to the service.

3. The computer-implemented method of claim 1, wherein the signatures of the queries are suspicious patterns detected for clients and the signatures of instances are suspicious patterns detected against service instances.

4. The computer-implemented method of claim 1, further comprising: in response to determining that a client requests data from multiple instances of the service, increasing a risk score of the client and risk scores of the multiple instances.

5. The computer-implemented method of claim 1, further comprising: in response to determining that a client requests data from an instance that are not in a geographical location of the client, increasing a risk score of the client and a risk score of the instance.

6. The computer-implemented method of claim 1, further comprising:
   in response to determining that a pattern of a client requesting data is different from a historical pattern, increasing a risk score of the client.

7. The computer-implemented method of claim 1, further comprising:
   in response to determining that data requested from multiple instances within a given time frame can be ordered in a sequence, increasing a risk score of the client and risk scores of the multiple instances.

8. The computer-implemented method of claim 1, further comprising:
   in response to determining that non-overlapping or mostly non-overlapping chunks from a data set are requested from multiple instances or by multiple clients in a given time frame, increasing risk scores of the multiple clients and risk scores of the multiple instances.

9. The computer-implemented method of claim 1, further comprising:
   in response to determining that a sum of data requested by a client from one or more instances shows an anomaly against a historical pattern, increasing a risk score of the client and risk scores of the one or more instances.

10. A computer system for detecting and preventing distributed data exfiltration attacks, the computer system comprising one or more processors, one or more computer readable tangible storage devices, and program instructions stored on at least one of the one or more computer readable tangible storage devices for execution by at least one of the one or more processors, the program instructions executable to:
    retrieve and analyze security information, data from an organization asset database, and data from a configuration management database;
    build an inventory of the service, based on the security information and the data from the organization asset database, and the data from the configuration management database;
    calculate historical usage statistics for a service in an infrastructure, instances of the service, and clients requesting the instances, wherein calculating historical usage statistics is based on the security information, the data from the organization asset database, and the data from the configuration management database;
    generating a baseline of normal usage activities for respective ones of the instances, based on the historical usage statistics;
    monitor current usage activities of the clients to build signatures of the instances, over sliding windows of the queries, wherein the signatures are anomalies in the current usage activities compared to the baseline of the normal usage activities;
    determine whether a data exfiltration attack to one of the instances is in progress, wherein the data exfiltration attack is distributed among the instances of the service instances to disguise the data exfiltration attack as a legitimate activity;
    in response to determining that the data exfiltration attack is in progress, increase a risk score of the one of the instances;
    calculate an overall risk score of the service, based on risk scores of the instances of the service; and
    in response to determining that the overall risk score of the service exceed a predetermined threshold, generate an alert of the data exfiltration attack.

11. The computer system of claim 10, further comprising the program instructions executable to: calculate an risk score of a client;
    in response to determining that the risk score of the client exceeds the predetermined threshold, block access of the client to the service.

12. The computer system of claim 10, wherein the signatures of the queries are suspicious patterns detected for clients and the signatures of instances are suspicious patterns detected against service instances.

13. The computer system of claim 10, further comprising the program instructions executable to: in response to determining that a client requests data from multiple instances of the service, increase a risk score of the client and risk scores of the multiple instances.

14. The computer system of claim 10, further comprising the program instructions executable to: in response to determining that a client requests data from an instance that are not in a geographical location of the client, increase a risk score of the client and a risk score of the instance.

15. The computer system of claim 10, further comprising program instructions executable to: in response to determining that a pattern of a client requesting data is different from a historical pattern, increase a risk score of the client.

16. The computer system of claim 10, further comprising program instructions executable to: in response to determining that data requested from multiple instances within a given time frame can be ordered in a sequence, increase a risk score of the client and risk scores of the multiple instances.

17. The computer system of claim 10, further comprising program instructions executable to: in response to determining that non-overlapping or mostly non-overlapping chunks from a data set are requested from multiple instances or by multiple clients in a given time frame, increase risk scores of the multiple clients and risk scores of the multiple instances.

18. The computer system of claim 10, further comprising program instructions executable to: in response to determining that a sum of data requested by a client from one or more instances shows an anomaly against a historical pattern, increase a risk score of the client and risk scores of the one or more instances.

* * * * *